United States Patent [19]

LeCompte

[11] Patent Number: 5,044,573
[45] Date of Patent: Sep. 3, 1991

[54] ROTATING DRUM FILAMENT DISPENSER
[75] Inventor: George W. LeCompte, Tucson, Ariz.
[73] Assignee: Hughes Aircraft Company, Los Angeles, Calif.
[21] Appl. No.: 370,665
[22] Filed: Jun. 23, 1989
[51] Int. Cl.⁵ .................... F41G 7/00; F41G 7/20; F42B 15/04; F42B 15/00
[52] U.S. Cl. .................... 242/54 R; 242/99; 242/128; 242/159; 102/504; 244/3.12
[58] Field of Search .............. 242/54 R, 289, 99, 128, 242/129, 169, 170, 159; 188/135, 136; 102/504; 244/3.12

[56] References Cited

U.S. PATENT DOCUMENTS

| 1,651,956 | 12/1927 | Krammer | 102/504 |
| 2,042,280 | 5/1936 | Stuart | 188/135 X |
| 2,774,547 | 12/1956 | Latimer | 242/54 R X |
| 2,950,876 | 8/1960 | McLaughlin | 242/54 R X |
| 3,648,940 | 3/1972 | Meredith | 242/54 R |
| 3,868,069 | 2/1975 | Schulz | 242/128 |
| 3,914,392 | 10/1975 | Klett | 423/445 |
| 3,986,678 | 10/1976 | Coquelet et al. | 242/289 |
| 4,103,841 | 8/1978 | Flynn et al. | 242/54 R X |
| 4,531,682 | 7/1985 | Schroder et al. | 242/54 R |
| 4,542,858 | 10/1985 | Manges | 242/54 R |
| 4,743,115 | 5/1988 | Arditty et al. | 242/54 R X |
| 4,903,607 | 2/1990 | Clark | 102/504 |

Primary Examiner—Stuart S. Levy
Assistant Examiner—Joseph A. Rhoa
Attorney, Agent, or Firm—R. M. Heald; C. D. Brown; W. K. Denson-Low

[57] ABSTRACT

A filament (18) dispenser for on board use in an airborne vehicle (10) in which a cylindrical bobbin (20) is rotatively mounted within the vehicle (10) with the axis of rotation normal to the vehicle longitudinal axis. A brake (48) prevents the bobbin (20) from exceeding predetermined rotational speed limits that would cause filament lift-off. A protective covering (44) is placed on a prescribed filament end portion length as reinforcement against startup tension damage to the filament (18).

12 Claims, 4 Drawing Sheets

ROTATING DRUM FILAMENT DISPENSER

BACKGROUND OF THE INVENTION

1. Field of the Invention

The present invention relates generally to filament dispensing apparatus for use on a missile or other airborne vehicle to establish a data link, and, more particularly, to such filament dispensing apparatus which rotates during use about an axis generally transversely of the direction of filament dispensing.

2. Description of Related Art

There are many present day weapon systems which include a launched missile having a wire or optical fiber data link, one end of which is connected to on-board control apparatus and the other end of which pays out at a high rate of speed during use to maintain interconnection with further control apparatus at the launch site.

There are a number of criteria which must be met by such apparatus in order to successfully act as a missile data link. First of all, filament payout has to be accomplished with a minimum of tension on the filament to avoid breakage, or in the case of an optical fiber, to prevent micro-bending which has been found to reduce the quality and efficiency of signal transmission. Secondly, the filament winding package should be stable so as to enable storage without having the winding collapse from its wound configuration. Thirdly, the winding should be dense and compact, taking as little space as is absolutely necessary.

A common type of present day filament dispenser consists of a generally cylindrical canister that is fixedly located at the aft end of the missile and onto which the filament is wound to achieve a tapered outside payout arrangement. A second form consists of a cylindrical canister in which the filament is wound so as to be able to effect payout from the inside of the filament package, the latter being especially utilized for torpedo and sonobuoy applications.

The outside payout canister approach suffers from poor space utilization due to the taper winding pack and layer-to-layer stepbacks which are typically used. On the other hand, inside payout overcomes the volumeteric efficiency penalty of the outside payout apparatus, but has yet to achieve the relatively high payout speeds required for missile applications. Also, the adhesive which is required to stabilize the filament windings, in both the inside and outside payout versions, causes severe bending of the cable at the peel point which induces high stress and concomitant optical signal loss. Still further, the incorporation of adhesive into the winding process adds significantly to production costs and contributes to optical loss of the wound fiber.

An even more difficult problem encountered with both of the noted prior art dispensing apparatus are that the filament on being withdrawn from an axially mounted fixed dispenser experiences a whirling motion imposing a requirement that the dispenser be mounted at the aft end of the vehicle, that it be mounted free from obstructions or that means be provided for damping the helix formed by the dispensed filament.

SUMMARY OF THE INVENTION

Filament to be dispensed for use as a data link is helically wound onto the periphery of a drum between two end flanges to form the filament pack. The drum is mounted within the missile for rotation about an axis arranged transversely to the missile longitudinal axis. The outermost layer or several layers of the filament pack are formed from a filament length that is enclosed within a protective covering that strengthens against the relatively high tensile forces that will be experienced in overcoming the drum inertia at start-up of drum rotation. Lacking this reinforcement the filament would very probably be severed. In addition, the protective covering acts to preserve the enclosed filament if it is so located that it must move through the exhaust gases during the initial part of the launch period.

The rotating drum is provided with a drag brake which prevents loss of control of the dispensed fiber as a result of centrifugal force. That is, without braking of the rotating drum, centrifugal force will cause the filament to lift off the drum prior to the desired exit position.

DESCRIPTION OF THE PREFERRED EMBODIMENTS

Figure 1:
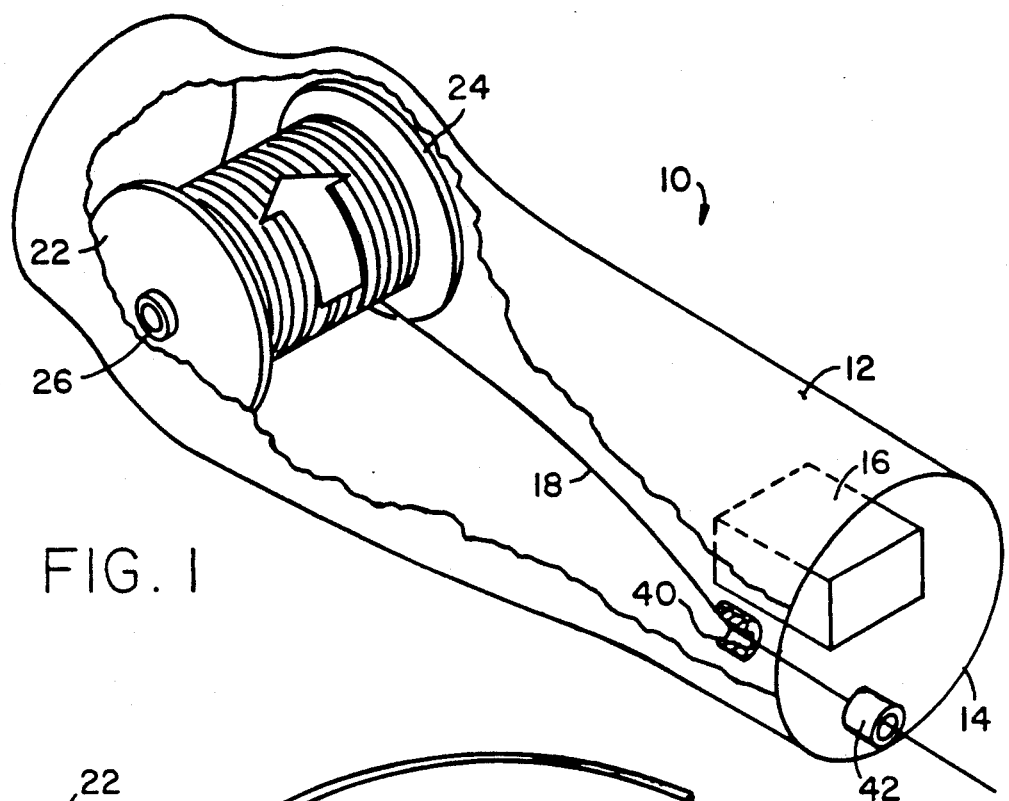
FIG. 1 is a perspective partially sectional view of the described filament dispensing apparatus shown mounted within a missile.

As shown in FIG. 1 of the drawings, a missile 10 typically includes a hollow, generally tubular aft housing 12 that has an open end 14 via which hot gases from an internal drive motor 16 effect propulsion. In many such missiles a filament 18, either wire or optical fiber, interconnects on-board electrical control equipment (not shown) with other control equipment at the launch site. Since the length of filament required may be considerable and the speed with which it is payed out is also high, the manner of winding the filament into a pack and the technique of payout of an optical fiber filament must not kink or place too much tensile force on the filament since this can substantially reduce optical signal quality, if not actually sever the filament.

Figure 2:
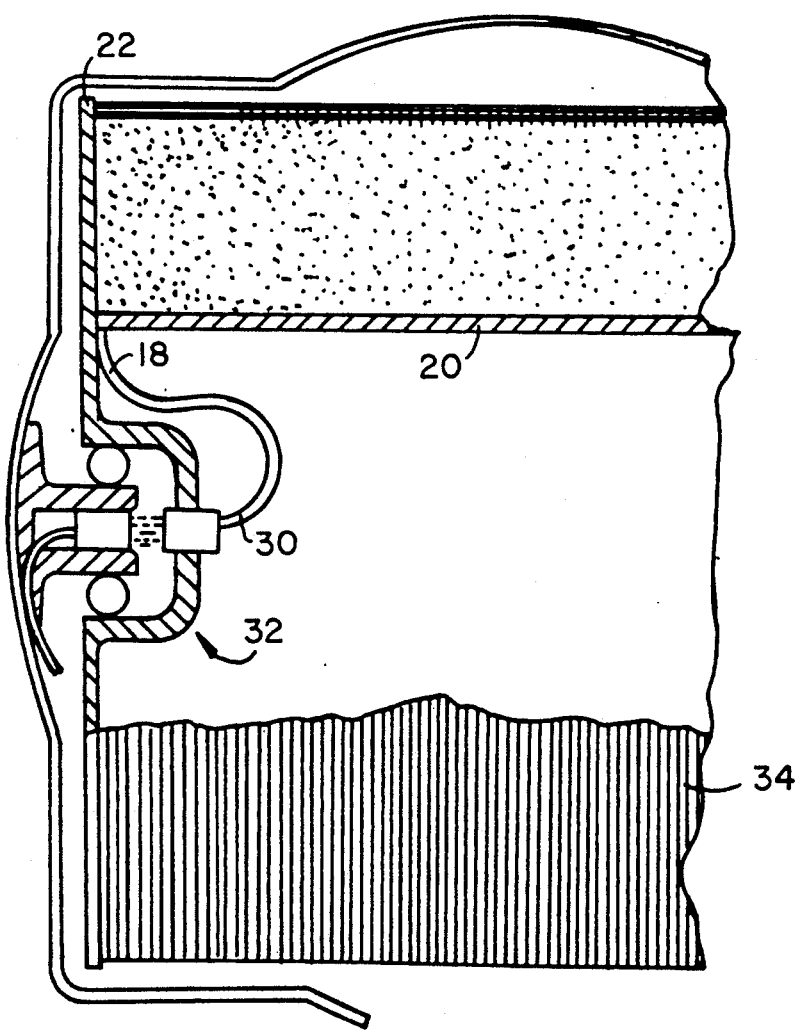
FIG. 2 is a sectional, elevational, partially fragmentary view taken through the dispensing apparatus.

For the ensuing description of the invention reference is made simultaneously to FIGS. 1 and 2. The filament 18 is helically wound onto a cylindrical bobbin or drum 20 having two circular end flanges 22 and 24. The bobbin is journaled to the missile sidewall at 26 (and on the opposite sidewall, not shown) so that the bobbin axis of rotation is transverse to the missile longitudinal axis and preferably at 90 degrees thereto.

Figure 5:
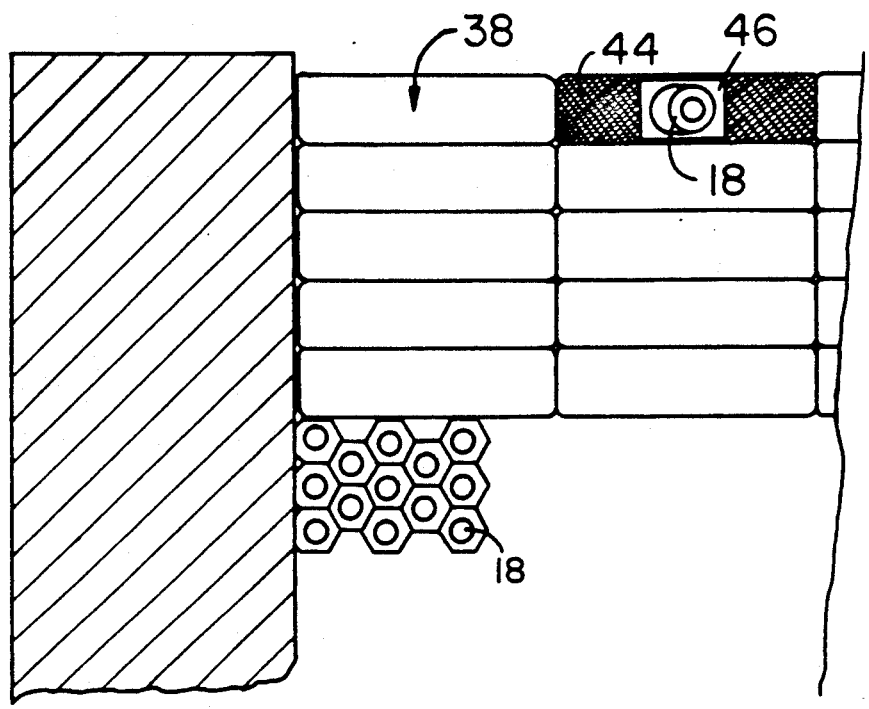
FIG. 5 is a sectional view through a leader.

A first end 30 of the filament is secured to a state of the art rotary connector 32 via which optical signals are fed to on-board control apparatus (not shown). The filament is then helically wound onto the bobbin to form a cylindrical spool 34. A predetermined outer end portion 36 is enclosed within a protective sleeve forming a leader 38 (FIG. 5). This leader, if the bobbin is located other than aft, passes through a pair of oversize tubular eyelets or guides 40 and 42 affixed to the inner surface of the missile wall to exit the missile for connection with launch site control apparatus (not shown).

The eyelets may not be required if the bobbin is located aft.

Turning now to FIG. 5, the leader 38 is seen to preferably consist of a ribbonlike length of a heat resistant and flexible plastic 44, e.g., KEVLAR, having a central, axially extending cavity 46 within which is loosely received the filament 18. More particularly, the leader is generally rectangular in cross-section and is wound onto the bobbin 20 with the larger flat surface of the leader facing the bobbin. When the leader is wound onto the underlying filament windings this loads the filaments and, in that way, suppresses tension in the filament which is so important in preventing optical signal transmission impairment. Specifically, the leader plastic 44 is prestretched when wound onto the bobbin to effect loading and due to the oversize dimensions of opening 46 the enclosed fiber is not placed in tension.

The leader serves, first of all, to provide the necessary strength to the filament to overcome the bobbin or drum inertia experienced during start-up. Without this the typical optical fiber, for example, would be severed on payout being initiated. Secondly, the plastic covering has high heat resistance which will preserve the filament in those cases where the filament is payed out through hot exhaust gases of a boost rocket.

Figure 6:
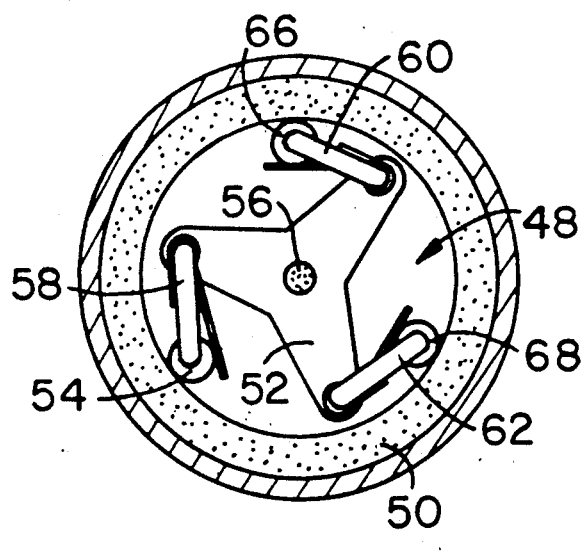
FIG. 6 is a side elevational, sectional view taken through the filament bobbin showing brake details.

FIG. 6 is a side elevational, sectional view taken through the bobbin and showing a preferred form of brake 48 for restraining rotation of the bobbin during filament payout. As shown there, the bobbin central part is a hollow cylinder. An ablative cylindrical lining 50 is of such external diameter as to permit snug receipt within the bobbin cavity where it is fixedly secured. Within the central opening of lining 50 is located a spider 52 affixed to the missile side walls and provided with a plurality of drag bars 54 which resiliently contact the inner surface of the ablative lining.

More particularly, the spider 52 is a three-pointed star construction with its center secured to a rod 56 having its ends extending through the bobbin journals to be secured to the missile walls. Lever arms 58, 60 and 62 have one end rotatably interconnected with a spider star end, and their other end secured to a cylindrical drag bar 54, 66 or 68, as the case may be.

The lever arms each include spring means 70 for resiliently urging its respective drag bar against the ablative lining inner surface.

Figure 3:
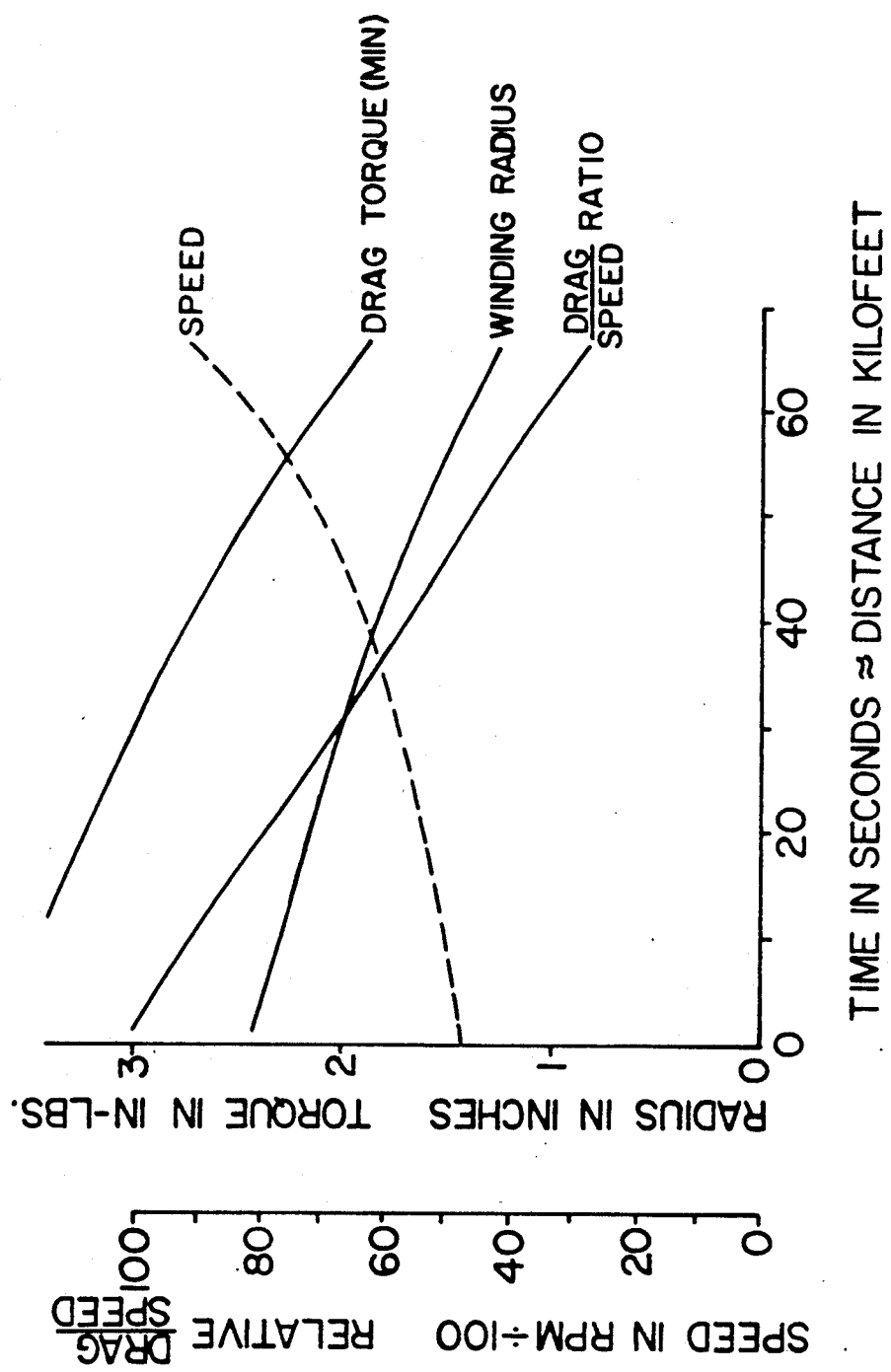
FIGS. 3 and 4 are graphs of various operating parameters of the described apparatus.
Figure 4:
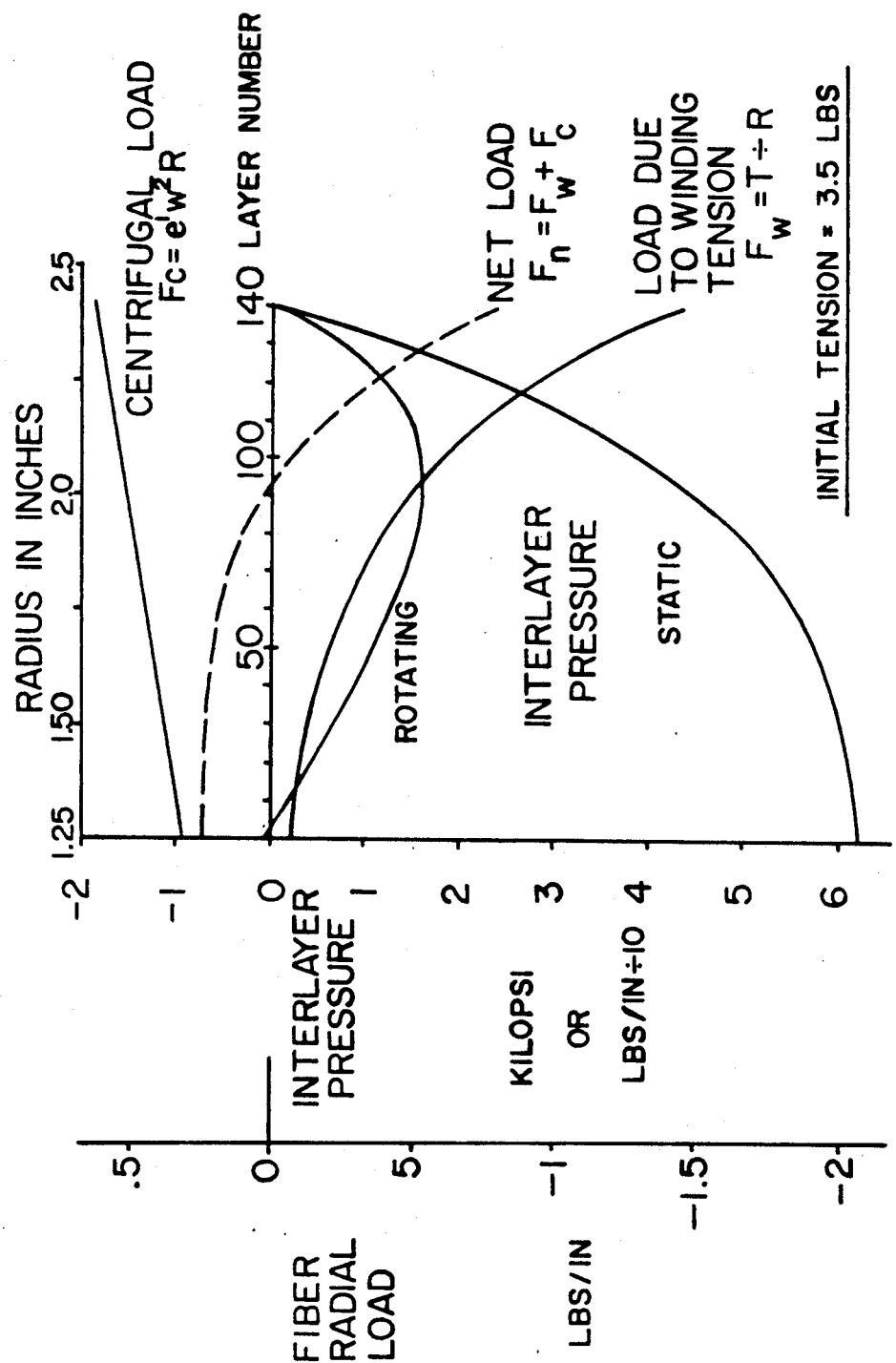

At missile launch, the leader begins paying out through the guides 40 and 42 causing the bobbin to rotate at a rate which can exceed 90,000 rpm. The length of leader is sufficient to protect the enclosed filament against start-up tensile forces and exhaust gases throughout boost, after which filament without protective covering is taken off the bobbin and payed out in the same manner as the leader. While the leader and filament is paying out the brake 48 is automatically applied to the bobbin with a predetermined braking force found necessary to prevent filament lift-off, already alluded to. As implicit from the graph of FIG. 3, the drag force of the brake force must reduce as payout continues and this is accomplished by the described brake in that as the ablative lining thins out (wears off) the braking force exerted by the brake is also reduced.

In practical constructions of the invention, the leader is pretensioned which reduces fiber tension in the underlying layers. High winding tension (e.g., 3.5 pounds) is used to prevent the fiber pack from being disturbed by the large centrifugal load resulting from bobbin rotation. When the bobbin is spinning, each filament turn is subjected to an outward centrifugal load that reduces the net loading, and, consequently, the interlayer pressure. With the selected winding tension, a positive interlayer pressure is maintained, assuring that the filament pack geometry will not be disturbed.

With reference particularly to FIG. 5, it is to be noted that the filament 18 without leader is wound in a manner sometimes termed "deep-nested" where adjacent windings in the same layer are spaced and an outer layer is wound into the interwinding spaces of the lower layer. Such a winding technique offers the advantages of excellent volumetric efficiency and the ability to provide a winding stack with squared ends. For a more detailed exposition of nested winding reference is made to co-pending U.S. patent application Ser. No. 263,804, HIGH DENSITY FILAMENT WINDING AND METHOD FOR PRODUCING IMPROVED CROSSOVERS AND INSIDE PAYOUT by G. W. LeCompte and assigned to the same entity as the present application.

Although the invention has been described in connection with a preferred embodiment, it should be understood that the invention is in no sense limited thereby and its scope is to be determined by that of the appended claims.

What is claimed is:

1. Fiber optic filament dispensing apparatus for an airborne vehicle which produces start-up tensile forces and exhaust gases during launch, comprising:
   a hollow cylindrical bobbin having flanges at each end thereof for receiving a length of filament wound onto the bobbin between said flanges;
   means for mounting the bobbin within the vehicle for rotation about an axis extending transversely to the direction the filament is dispensed from the bobbin;
   brake means within the bobbin for slowing bobbin rotation during filament dispensing to place the dispensed filament under a predetermined amount of tension; and
   protective means engaging the filament for joint movement therewith, said protective means preventing said vehicle start-up tensile forces and exhaust gases from destroying or degrading the fiber optic filament as the filament is dispensed from the bobbin.

2. Filament dispensing apparatus as in claim 1, in which said protective means comprises a protective covering enclosing a predetermined outermost end portion of the filament.

3. Filament dispensing apparatus as in claim 2, in which the protective covering is placed in tension when wound upon the bobbin.

4. Filament dispensing apparatus as in claim 2, in which the protective covering is of sufficient length to enable placing all the tension on the protective covering until the bobbin is at its maximum rotational dispensing speed.

5. Filament dispensing apparatus as in claim 2, in which the protective covering consists of a flexible synthetic plastic body having an oversized opening therein for receiving the filament.

6. Filament dispensing apparatus as in claim 1, in which the brake means includes an ablative hollow cylinder fixedly mounted to the interior wall of the bobbin and at least one drag bar contactingly engaging the inner surface of the ablative cylinder.

7. Filament dispensing apparatus as in claim 6, in which the drag bar is mounted at the end of an arm which is fixedly located with respect to the bobbin cylinder, and a spring resiliently urges the drag bar against the ablative cylinder.

8. Filament dispensing apparatus as in claim 1, in which there is further provided a guide tube secured to the vehicle and aligned generally parallel to the vehicle path of movement for receiving the dispensed filament from the bobbin and guiding it to the vehicle exterior.

9. Optical fiber dispensing apparatus at one end of a data link for use with an airborne vehicle which produces start-up tensile forces and exhaust gases during launch, comprising:
   a cylindrical bobbin having helically wound thereon a length of optical fiber;
   means for mounting the bobbin for rotation about its cylindrical axis;
   means for guiding the optical fiber as it unwinds from the bobbin in a direction generally normal to the bobbin cylindrical axis; and
   a protective covering enclosing a predetermined outermost end portion of the optical fiber for joint movement therewith, said protective cover functioning to shield at least the outermost bobbin winding layer from the start-up tensile forces and exhaust gases produced by the airborne vehicle as the optical fiber is dispensed.

10. Optical fiber dispensing apparatus as in claim 9, in which a brake means is provided for slowing bobbin rotation during fiber dispensing.

11. Optical fiber dispensing apparatus as in claim 10, in which the bobbin is hollow and the brake means includes a body member constructed of an ablative material fixedly mounted to the bobbin interior surface and at least one drag bar contacting the member and moving thereacross on bobbin rotation.

12. Optical fiber dispensing apparatus as in claim 9, in which a rotary connector is mounted onto the bobbin for interconnection with the inner winding fiber end.

* * * * *